US010158390B2

(12) United States Patent
Hekstra et al.

(10) Patent No.: US 10,158,390 B2
(45) Date of Patent: Dec. 18, 2018

(54) SIGNAL PROCESSING USING QUANTIZED SYMBOLS

(71) Applicant: NXP B.V.

(72) Inventors: Andries Hekstra, Eindoven (NL); Alessio Filippi, Eindhoven (NL); Semih Serbetli, Eindhoven (NL); Arie Koppelaar, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/139,457

(22) Filed: Apr. 27, 2016

(65) Prior Publication Data

US 2016/0344435 A1    Nov. 24, 2016

(30) Foreign Application Priority Data

May 20, 2015  (EP) .................................... 15168525

(51) Int. Cl.
*H04B 1/16* (2006.01)
*H04L 1/00* (2006.01)
(Continued)

(52) U.S. Cl.
CPC ............. *H04B 1/16* (2013.01); *H04L 1/0052* (2013.01); *H04L 1/0061* (2013.01);
(Continued)

(58) Field of Classification Search
CPC ....... H04B 1/16; H04L 1/0052; H04L 1/0061; H04L 1/0071
See application file for complete search history.

(56) References Cited

U.S. PATENT DOCUMENTS 8,312,341 B1 * 11/2012 Varnica ................. H04L 1/0001
714/746
9,306,639 B2    4/2016 Burchard et al.
(Continued)

FOREIGN PATENT DOCUMENTS

WO       2012110392 A1    8/2012
WO    WO 2012110392 A1 *  8/2012    ............. H04H 20/72
(Continued)

OTHER PUBLICATIONS

Extended European Search Report for Patent Appl. No. 15168525.2 (Dec. 1, 2015).
(Continued)

*Primary Examiner* — Wednel Cadeau
(74) *Attorney, Agent, or Firm* — Rajeev Madnawat (57) ABSTRACT

According to the present disclosure, there is provided methods of processing a signal using quantized symbols. More particularly, in one example, the method comprises the steps of processing a signal (206), said method comprising the steps of: receiving a signal (206) comprising a plurality of raw symbols, each raw symbol having a plurality of bits and being conveyed in a channel; estimating a channel state information value (206) of the channel used to convey each raw symbol to generate a corresponding plurality of channel state information values; quantizing the plurality of raw symbols based on their channel state information values to generate a sequence of quantized symbols (214); and quantizing the channel state information values to generate a sequence of quantized channel state values (216).

13 Claims, 9 Drawing Sheets

(51) Int. Cl.
*H04L 25/06* (2006.01)
*H04L 25/02* (2006.01)

(52) U.S. Cl.
CPC ........ *H04L 1/0071* (2013.01); *H04L 25/0202* (2013.01); *H04L 25/067* (2013.01)

(56) References Cited

U.S. PATENT DOCUMENTS

| | | | |
|---|---|---|---|
| 2005/0002472 A1* | 1/2005 | Lee .................. | H04L 5/006 375/316 |
| 2007/0019761 A1 | 1/2007 | Park et al. | |
| 2009/0103601 A1 | 4/2009 | Du et al. | |
| 2010/0182916 A1 | 7/2010 | Drewes et al. | |
| 2010/0234071 A1 | 9/2010 | Shabtay et al. | |
| 2010/0255772 A1 | 10/2010 | Hellman | |
| 2011/0044379 A1 | 2/2011 | Lilleberg et al. | |
| 2011/0176447 A1 | 7/2011 | Lee et al. | |
| 2013/0215860 A1 | 8/2013 | Cho et al. | |
| 2014/0045541 A1 | 2/2014 | Moshfeghi | |
| 2014/0148093 A1 | 5/2014 | Nguyen et al. | |
| 2015/0016576 A1 | 1/2015 | Koppelaar et al. | |
| 2015/0198457 A1 | 7/2015 | Nagy et al. | |
| 2016/0105199 A1 | 4/2016 | Wu et al. | |
| 2016/0226528 A1 | 8/2016 | Serbetli et al. | |

FOREIGN PATENT DOCUMENTS

| | | | | |
|---|---|---|---|---|
| WO | WO-2012110392 A1 * | 8/2012 | ............. | H04H 20/72 |
| WO | 2014029425 A9 | 2/2014 | | |
| WO | 2014070074 A1 | 5/2014 | | |

OTHER PUBLICATIONS

Huang, C.Y. et al: "Viterbi decoder design and performance evaluation for mobile satellite fading channels", Global Telecommunications Conf., Communication for Global Users, pp. 432-436 (1992).

Rosati, S. et al. "LLR Compression for BICM Systems Using Large Constellations", IEEE Transactions on Communications, vol. 61, No. 7, pp. 2864-2875 (Jul. 2013).

Baggen, S. et al. "Using R0 for Determining the Quantization of the input of a Viterbi Decoder on Fading Channels", Philips Research Laboratories, 10 pgs.

Extended European Search Report for Patent Appl. No. 15178127.5 (dated Nov. 9, 2015).

Laneman. J.N. et al., "Cooperative Diversity in Wireless Netowrks: Efficient Protocols and Outage Behavior", vol. 50, No. 2, Dec. 2004, pp. 3062-3080.

Extended European Search Report for Patent Appl. No. 15153340.3 (dated Jul. 8, 2015).

Danieli, M. et al.; "Maximum Mutual Information Vector Quantization of Log-Likelihood Ratios for Memory Efficient HARQ Implementations", Data Compression Conference, pp. 30-39 (Mar. 2010).

Kurkoski, B.M. et al. "Quantization of Binary-Input Discrete Memoryless Channels", IEEE Trans. on Communications, vol. 61, No. 7, pp. 2864-2875, (Jul. 2013).

Thibault, L. "Performance evaluation of COFDM for digital audio broadcasting, Part I: Parametric study", IEEE Trans. On Broadcasting, vol. 43, No. 1, pp. 64-75 (Mar. 1997).

Webb, J.L.H. "Efficient table access for reversible variable-length decoding", IEEE Trans. On Circuits and Systems for Video Technology, vol. 11, No. 8, pp. 981-985 (Aug. 2001).

* cited by examiner

SIGNAL PROCESSING USING QUANTIZED SYMBOLS

CROSS-REFERENCE TO RELATED APPLICATIONS

This application claims the priority under 35 U.S.C. § 119 of European Patent application no. 15168525.2, filed on May 20, 2015, the contents of which are incorporated by reference herein.

FIELD

The present disclosure relates to methods of processing a signal using quantized symbols. More particularly, the disclosure relates to quantizing the raw symbols and the channel state information values of a received signal to generate a sequence of quantized symbols and a sequence of quantized channel information values that are used to calculate a sequence of soft bits.

BACKGROUND

Digital communication of information transmitted by one or more transmitters and received by one or more receivers generally requires special signalling methods. One such example is orthogonal frequency-division multiplexing, known as OFDM, that uses frequency-division multiplexed signals to carry data, which are conveyed in channels.

To mitigate against the effects of noise and fading within the channels used to convey the signals, forward error correction techniques are generally employed, together with frequency and/or time interleaving of the signal to provide redundancy and to increase the robustness of the signals as will be explained below.

The quality of a channel used to convey the signal can vary, particularly with wireless communication protocols and channels, due to multipath effects caused by diffraction or reflection of signals from obstructions such as buildings in the signals path. For wireless signals, depending on whether reflected signals add up coherently or out of phase, a received signal may be in a good channel where the signal is a good representative of the sent signal, or in a deep fade channel where the signal is attenuated, and/or phase shifted when travelling from the source to the receiver. To overcome the negative effects of poor deep fade channels, wireless systems are designed to insert redundancies in the transmitted signal so that faded signals can be reconstructed at the receiver side. As noted above, this is done by the use of channel coding such as convolutional coding, turbo coding or low density parity check (LDPC) codes etc.

Typically, when a signal is sent, first the bits are encoded with a channel coder, e.g., a FEC (Forward Error Correction) block or encoder and redundancy bits are inserted. Next these bits are interleaved by an interleaver block over a different time and frequency of the signal so that they experience different channels in the coded block. The bits are then modulated and sent over the, for example, wireless channel. At the receiver side, the transmitted bits are demodulated and the reliability information of each bit is computed in the form of a probability of likelihood that the value of the received bit is (for example, for a digital signal) a particular value. This information can be considered to be soft bits. One example of such soft bits are log-likelihood-ratios (LLRs) which, depending upon their value, provide a likelihood that the received bit has one value or a different value. In wireless communication examples, the LLRs can be used by the receiver to determine the likelihood that the value of a received bit is either a 0 or a 1 (for a digital signal). The LLRs can have a different resolution depending on, for example, the application and/or the wireless system. A deinterleaver block can then align the LLRs against the respective received bit, compensating (or inverting) the operation of the interleaver at transmitter side, and feeding the compensated value of the received bit to the FEC decoder to be processed.

Channel conditions can vary depending upon the positions of the transmitter and receiver and also due to variations in the obstructions in the line of signal path. For example, the channels of signals received by a moving car can vary depending upon the position of the car relative to its surroundings. Such variations are difficult to predict and can be considered random. Accordingly, each channel can be a random varying channel with varying channel conditions. Due to this potential varying nature of channel conditions, to make channel coding more robust against fading effects, the encoded bits are interleaved such that the bits that in that instance are experiencing similar channel conditions, e.g., bits that are experiencing good channels or faded channels, are spread all over different parts of the channel code so that they can be corrected in a more efficient way. Thus, interleaving plays an important role in wireless communication systems. As the size of the interleaver block is increased, the system becomes more robust against fading effects.

To overcome the fading effects of the wireless channel, the digital audio broadcasting (DAB) standard chose the interleaver size as 384 ms. Thus, the deinterleaver block needs to store the LLRs within a memory such as flash memory during the 384 ms duration so that it can feed the LLRs to the FEC decoder correctly. Every standard has its own design choice of interleaving size. As the size of the interleaver is increased, the number of softbits to be stored increases, leading to larger memory cost if the bits need be stored on the receiver.

The interleaver/deinterleaver memory generally has a large cost of implementation within an integrated circuit area used for a wireless receiver. Accordingly, if a large interleaving size is chosen, this choice increases the cost of the receiver. One conventional way of reducing the memory cost requirement of the interleaver/deinterleaver memory (i.e. the size of the flash memory or random access memory or other form of memory) is to reduce the number of bits used to represent the LLRs. However, as the number of bits used to represent the LLRs is decreased, the FEC decoder works less effectively, correcting less erroneous bits which decreases the reliability of reception. Thus, for example in a DAB receiver, the listener hears lower quality audio signal or in a digital video broadcasting—e.g. a second generation (DVB-T2) receiver, the viewer experiences more video frame errors.

In a conventional receiver, the LLRs are generated as words stored at an address in memory of the receiver. The words have a word width measured in N bits. Accordingly, the words of the LLRs are stored and read in N bits, deinterleaved, and fed to the FEC decoder still in an N bit accuracy. Thus, the accuracy of the LLRs does not change until it is used by a FEC decoder.

As an example of another modulation protocol, bit interleaved coded modulation (BICM) is widely used in wireless systems such as digital radio, TV broadcast, WiFi, cellular and satellite systems as well as wired systems to overcome the negative effects of noise and fading in the wireless/wired channel. The bits are encoded, interleaved and mapped to symbols at the transmitter side and demodulation, deinterleaving and decoding is done at the receiver side. To achieve higher data rates, larger constellation sizes are used, e.g., 64 quadrature amplitude modulation (QAM) in ISDB-T/IEEE 802.11a/g, 4096 QAM in DVB-C2.

With the use of larger constellation sizes such as 64 QAM and up, the required memory/speed to store/transfer the LLRs per symbol multiplies with the number of bits transmitted per symbol, e.g., a 6 times memory or bandwidth requirement for 64QAM than for binary phase shift keying (BPSK) modulation.

In a conventional distributed receiver system, distributed receivers compute the LLRs of each bit and send this information to the master processing unit that performs de-interleaving and FEC decoding. In this case, each receiver requires a data link to the master processing unit with minimum data rate of (N×T×1/r) where N is the resolution of the LLRs, T is the net throughput of the data intended to be decoded and r is the FEC coding rate.

Although a distributed reception system does not necessarily have the same issues with the cost of memory of storing LLR values, each computed LLR must be sent to the master processing unit for de-interleaving and decoding. This has a cost due to the bandwidth required to exchange data with the master processing unit. Accordingly, as the symbol size and rate increases, the bandwidth requirements also increase. Minimising this bandwidth usage is therefore desirable.

This disclosure aims to help at least some of the above identified concerns by aiming to reduce the memory cost of (de-)interleaver memory for both a conventional and/or a distributed receiver and also for a distributed receiver to reduce the bandwidth cost for the exchange of data, e.g., LLRs. As noted above, the memory cost is related to the size of interleaver required to store the data, whilst reducing bandwidth costs is related to the symbol size (constellation) and the symbol distribution rate. For both scenarios, an efficient representation of the data, such as LLRs, is desirable.

This disclosure represents the data, such as LLRs, in a more efficient way than conventional techniques so that the memory cost or transmission cost of this data is reduced. In some cases this may lead to reduced cost on memory or reduced bandwidth requirement when sending the data, such as to another system for channel decoding.

SUMMARY

According to a first aspect of the present disclosure, there is provided a method of processing a signal, said method comprising the steps of: receiving a signal comprising a plurality of raw symbols, each raw symbol having a plurality of bits, and being conveyed in a channel; estimating a channel state information value of the channel used to convey each raw symbol to generate a corresponding plurality of channel state information values; quantizing the plurality of raw symbols based on their channel state information values to generate a sequence of quantized symbols; quantizing the channel state information values to generate a sequence of quantized channel states values; and calculating a sequence of soft bit values, based on the sequence of quantized symbols and the sequence of quantized channel state values.

In embodiments, the step of quantizing the plurality of raw symbols may comprise the steps of: quantizing the raw symbols into a number of quantization bins, each quantization bin having a width equal to fractions of the channel state information values. The width of each quantization bin may be uniform between quantization bins or a non-uniform width may be used between quantization bins. As an example, the width of uniform quantization bins may be equal to a single fraction of the channel state information values. As another example, the width of non-uniform quantization bins may be equal to several fractions of the channel state information values, so a first bin has a width equal to one fraction of the channel state information value, a second bin has a width equal to a second fraction of the channel state information value, etc.

By defining the width of the quantization bin according to a fractional factor of the channel state information value, the number of quantization bins may be defined without the need to anticipate or store a large range of raw symbol values. As noted above, large interleaver sizes require a large cost of memory to store the received symbol information prior to quantization. By quantizing based on the channel state information values, the memory requirement may be reduced. This is equally applicable to, for example, distributed systems that transmit data. By quantizing the raw symbols based on the channel state information values and sending this information to a central unit for soft bit calculation rather than calculating soft bits in each receiver, a lower bandwidth may be required than sending all the soft bit values.

By quantizing the raw symbols prior to calculation of a soft bit value such as an LLR, the memory cost and/or transmission cost to a device may be reduced due to the need to store only the information about which quantization bin each quantized symbol is in and the quantized channel information, rather than the values of each raw symbol and its channel state information value. During the subsequent bit deinterleaving, such an approach may also allow the soft bit such as a LLR to be generated as needed before being, for example transmitted to a master processing unit in a distributed receiver system or before being used by the device, rather than having to be generated based on all received raw symbols.

The widths of the quantization bins may be non-uniform. This may allow a tailoring of the widths of the quantization bins according to where the signal is most probable.

In embodiments the sequence of quantized symbols and/or the sequence of quantized channel state values may be stored. Additionally or alternatively the sequence of quantized symbols and/or the sequence of quantized channel state values may be transmitted to a module for further processing. The module may be a master processing unit in a distributed receiver system.

In embodiments each quantization bin may have a quantization value and the dynamic range of the quantization values of the bins may be a scaled version of a magnitude of the corresponding channel, dependent upon the modulation chosen for the signal. Generally the symbol may be quantized into a number of quantization bins with a dynamic range of quantization values. In examples, the range of quantization values may be a scaled version of a magnitude range of the channel, and may be dependent upon a modulation chosen for the signal. The modulation may be a quadrature amplitude modulation scheme, known as QAM, such as 8QAM, 16QAM, 32QAM, 64QAM or 128QAM or a multiple frequency phase shift keying scheme, known as MPSK. This provides a way of providing a range of quantization values or bins into which the symbols may be quantized based on the information contained within the channel, which may be determined in an earlier step by the method.

In embodiments, the step of quantizing the plurality of channel state information values may comprise the steps of: quantizing the channel state information values into a number of channel quantization bins, each channel quantization bin having a width representative of one or more channel state information values. As noted above, the widths of the channel quantization bins may be non-uniform.

The channel state information may be quantized dependent upon one or more of a code rate, average magnitude of the channel and the phase of the channel as well as operating Signal to noise ratio (SNR) and the recent history of channel and signal information.

In further embodiments, the step of quantizing the plurality of raw symbols and the channel information may further comprise the step of: equalising the raw symbols using the complex conjugates of their channel information values prior to quantization of the symbols. This may further reduce the required range of quantization values and steps required in the quantization step.

The soft bit values may be LLRs calculated for each bit.

In time- and/or frequency varying channels, the LLR may be also dependent on the channel state. For each bit of a symbol an LLR may be determined. The value of the LLR may depend upon the received symbol and the (actual) state of the channel. Symbol information and channel state information may be quantized and used as inputs for calculating the sequence of soft bit values, such as LLRs. The soft bit values may represent the ensemble of raw symbols and channel states that correspond to the quantization bins into which the raw symbols are quantized into.

As noted above, the sequence of quantized symbols and the sequence of quantized channel state values may be stored in a memory prior to being time/frequency deinterleaved using a deinterleaver. This may be useful if, for example, a distributed network of receivers is used.

In a distributed network, each distributed receiver may receive a common transmitted signal, although the received signal each distributed receiver receives may have experienced different channel states. Each distributed receiver may then determine a sequence of quantized symbols and a sequence of quantized channel states values based on the received signal received by the distributed receiver. These quantized sequences may then be provided to a central unit for calculation of a sequence of soft bit values, such as LLRs.

The LLRs, once calculated, may be provided to a bit deinterleaver where bit deinterleaving may be undertaken. The output from the bit deinterleaver may then be provided to a forward error correction block where forward error correction may be undertaken. Accordingly, a stream of decoded bits from the forward error correction block may then output.

The step of providing the LLRs to a bit deinterleaver may further comprise the steps generating an address of the requested LLR and reading the corresponding quantized symbol and quantized channel information from memory and computing the requested LLR by using the quantized symbols and quantized channel information. This may be considered to be computation of the requested data, such as LLRs, on demand.

A cache memory may be provided as an additional memory for storing the previously accessed quantized symbol and channel information for accessing the same information with lower access times that will be used for computing the other LLRs in the symbol.

According to a second aspect of the present disclosure, there is provided an integrated circuit for a receiver configured to process a signal the integrated circuit configured to: process the signal according to the method of the first aspect.

According to a third aspect of the present disclosure, there is provided a communication system comprising one or more receivers, each receiver being configured to receive a signal comprising a plurality of a raw symbols, each raw symbol having a plurality of bits and being conveyed in a channel, said receiver comprising: a channel estimator module for estimating channel state information values of the channel used to convey a signal; a symbol quantization module for quantizing the plurality of raw symbols based on their channel state information values to generate a sequence of quantized symbols; and a channel quantization module for quantizing the channel state information values to generate a sequence of quantized channel states.

In embodiments, the system may further comprise a central unit configured to receive, from each of the one or more receivers, one or more of the quantized symbols and one or more of the quantized channel states, wherein the central unit comprises: a processor for generating a combined quantized symbol of the received one or more of the quantized symbols and for generating a combined quantized channel state values of the received one or more of the quantized channel state values, from the one or more receivers;

a soft bit module for generating a soft bit value based on the combined quantized symbol and the combined quantized channel state values; and a deinterleaver module for deinterleaving the combined quantized symbol and the combined quantized channel state.

The processor may generate the combined quantized symbol by determining a weighted sum of the received one or more of the quantized symbols. The processor may also or separately generate the combined quantized channel state values by taking the square root of the sum of the squared magnitudes of the individual channel state values.

According to a further aspect of the present disclosure, there is provided a communication system comprising one or more receivers, at least one of the one or more receivers having an integrated circuit as defined in the second aspect.

Additionally, the proposed aspects can be applied to different modulation sizes, e.g., binary phase-shift keying (BPSK), quadrature phase-shift keying (QPSK), M-quadrature amplitude modulation (M-QAM), M-phase-shift keying (M-PSK) and their differential versions.

The described aspects may be beneficial in wireless communication systems with large interleaver memory such as digital radio, TV standards and satellite communication systems. The proposed aspects may reduce the memory requirements of such receivers.

Additionally, the proposed aspects may be beneficial in systems where the LLRs need to be sent to a master processing unit to be processed further. An example of such a system is distributed receiver architectures where the distributed slave receivers only generate the quantized symbols and channel states and send these to a master processing unit to be processed further. A more specific example is a distributed Intelligent Transport System (ITS) receiver in a car where distributed receiver chips may send the quantized information to each other to further combine these such that LLRs representing a better reliability may then be computed, rather than computed from the individual quantized information.

Another system where such kind of approaches may be applicable is low power radios with physical size constraints such as in Internet of Things devices or medical devices such as hearing aids. As discussed above FECs with interleavers may help to improve the reception quality in such devices. However, these add a memory cost to these devices. The proposed approach aims to reduce the memory cost of such devices.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), flash memory, or a chip as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

These and other aspects of the disclosure will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 1:
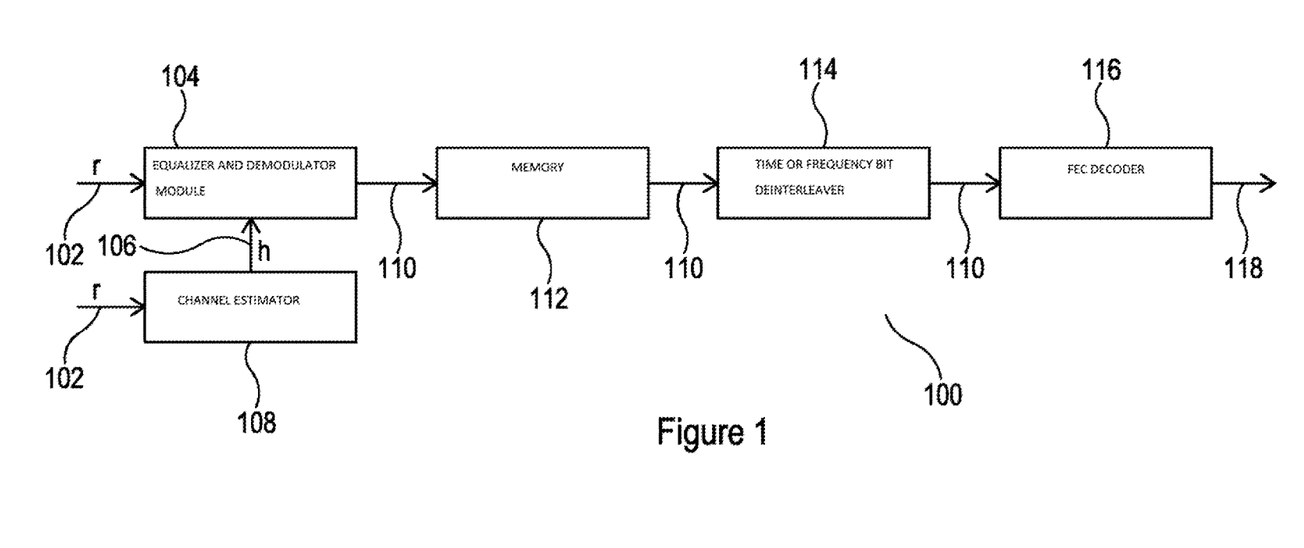
FIG. 1 is a schematic outlining the processing of a received signal by a conventional receiver.

FIG. 1 shows a conventional receiver 100. In a conventional receiver 100, a signal, r, 102 comprising a plurality of raw symbols is received by the receiver 100. Each raw symbol itself comprises a plurality of bits and the raw symbols are conveyed in a channel. In the example shown, the channel is a wireless channel based on a channel frequency transfer function estimated for a particular time interval. However it can be appreciated that other known definitions of channels may be used, such as a physical link between the transmitter of the signal 102 and the receiver 100. The signal 102 is received by an equalizer and demodulator module 104 which equalises and demodulates the received raw symbols. An estimate of channel information 106 describing the channel used to convey the signal 102 is determined by a channel estimator 108. For each bit, a log likelihood ratio 110, known as LLR is calculated. The LLRs 110 are generated with a bit length of N, so that they are then stored in memory 112 and subsequently read in N bits. When needed, the N bit LLRs 110 are provided to a time or frequency bit deinterleaver 114. The LLRs are then deinterleaved and fedback to a FEC decoder 116 in N bit accuracy to generate decoded bits 118. Accordingly, the accuracy of the LLRs 110 does not change until they are used by the FEC decoder. For 64QAM modulated symbols, 6 LLRs are generated for every 6 information bits, and they are stored in the memory and deinterleaved.

Figure 2:
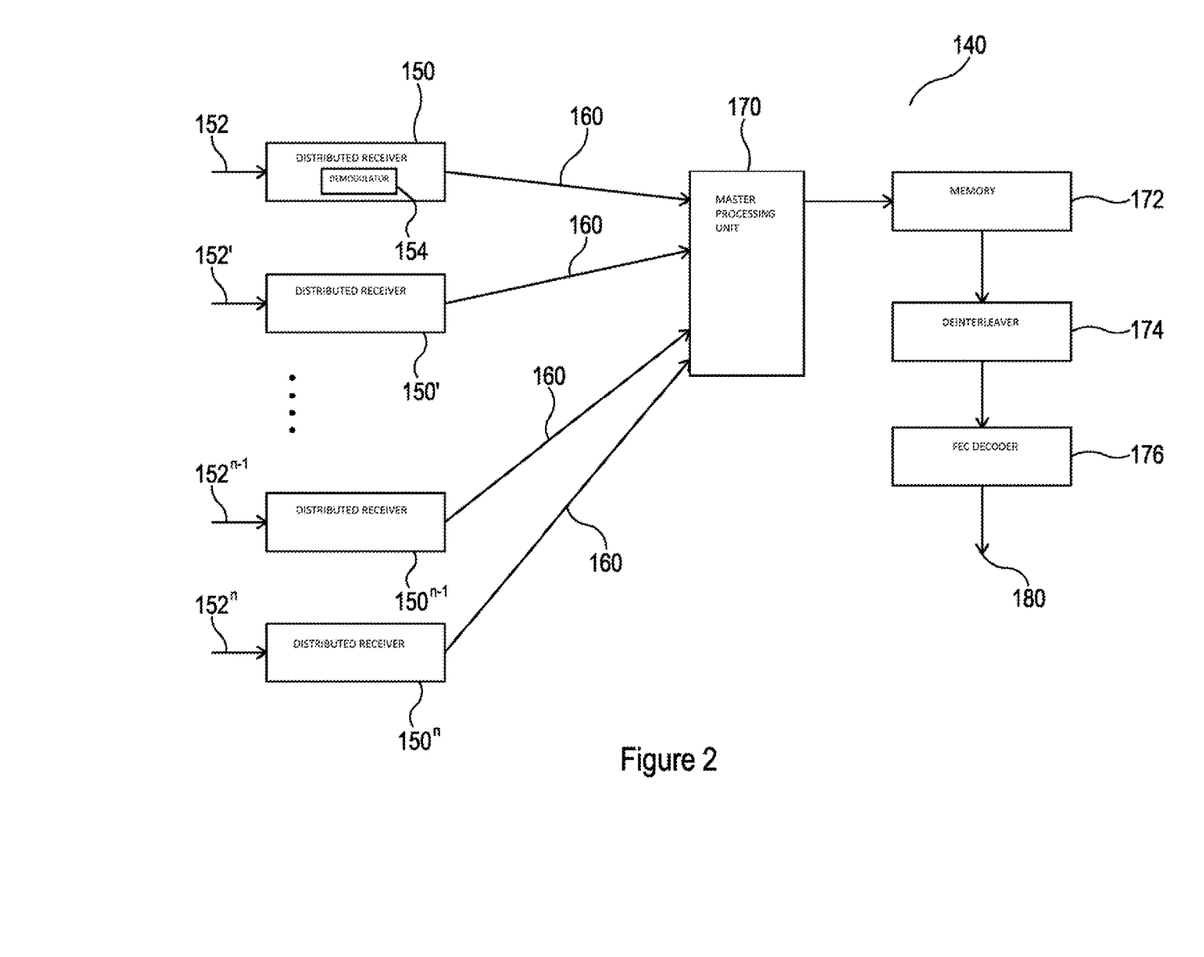
FIG. 2 is a schematic outlining the of processing of a received signal by a conventional distributed receiver system.

FIG. 2 shows a conventional distributed reception 140 utilising the receiver of FIG. 1. In the conventional distributed reception as in FIG. 2, the distributed receivers 150, 150', ... 150$^{n-1}$, 150$^n$ each receive a signal 152, 152', ... 152$^{n-1}$, 152$^n$ at a demodulator 154 within each distributed receiver 150, 150', ... 150$^{n-1}$, 150$^n$. The signals received by a demodulator 154 are shown as a common signal 152, however the channels on which the signals are conveyed may have differing strengths or values depending upon the conditions, such as obstructions, between the transmitter and receiver. The demodulator 154 for each receiver 150 computes the LLRs 160 of each bit for the signal 152 received by the respective demodulator 154 and sends this information to a master processing unit 170. The master processing unit 170 comprises a memory 172, deinterleaver 174 and FEC decoder 176. The master processing unit 170 collates and adds up the LLRs 160 for each bit received from the receivers 150 and subsequently deinterleaves the LLRs and provides them for FEC decoding and generation of decoded bits 180.

Unlike in the single receiver case, for a distributed reception 140, the accuracy of the LLRs 170 can vary as LLRs are added from each contributing receiver 150 for each received information bit. In such cases, the resulting summed LLR value is used as an input to the FEC decoder 176. In this case, each receiver generally has a data link to the master processing unit 170 with a minimum data rate of (N×T×1/r) where N is the resolution of the LLRs, T is the net throughput of the data intended to be decoded and r is the FEC coding rate.

Most of the communication and broadcast standards have bit/symbol/time/frequency interleaving as separate interleaving blocks, e.g., ISDB-T standard. Symbol/time interleaving operates on the modulated symbols and they are designed to exploit channel variation over long durations.

Thus, they need quite large memory sizes. LLRs from the same symbol are correlated since they use the same channel and received signal to compute LLRs.

Figure 3:
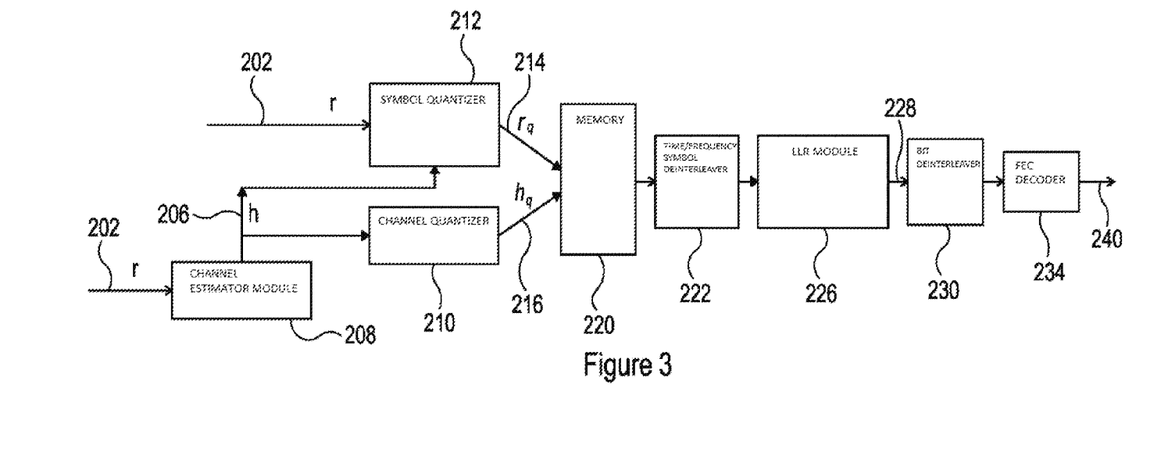
FIG. 3 is a schematic outlining processing of a received signal by a receiver according to an example of the present disclosure.

FIG. 3 outlines the steps used to process a signal according to the present disclosure. A received signal 202, r, comprising a plurality of raw symbols, each having a plurality of bits, and conveyed in a channel, is provided to the system or device. The channel state information value 206, h, of the received signal 202 is determined by a channel estimator module 208 and is then provided to a channel quantizer 210 and a symbol quantizer 212 with the received signal 202. The signal 202 and the channel state information values 206 are used to generate a plurality of quantized symbols 214, $r_q$, whilst the channel state information value 206 is also used to generate a quantized channel state value 216, $h_q$. The quantized symbols and the quantized channel state values are then stored in memory 220 before being called from the memory to a time/frequency symbol deinterleaver 222. The deinterleaving operation is done on the compressed information (i.e. the quantized symbols and the quantized channel state information values). Before subsequent bit deinterleaving by a bit deinterleaver 230, the LLRs 228 of the bits of the raw symbols are generated or computed in a module 226 by using the compressed information 214, 216. The LLRs 228 are then fed into the bit deinterleaver 230 and a FEC decoder 234 to generate a decoded bitstream 240.

Figure 4:
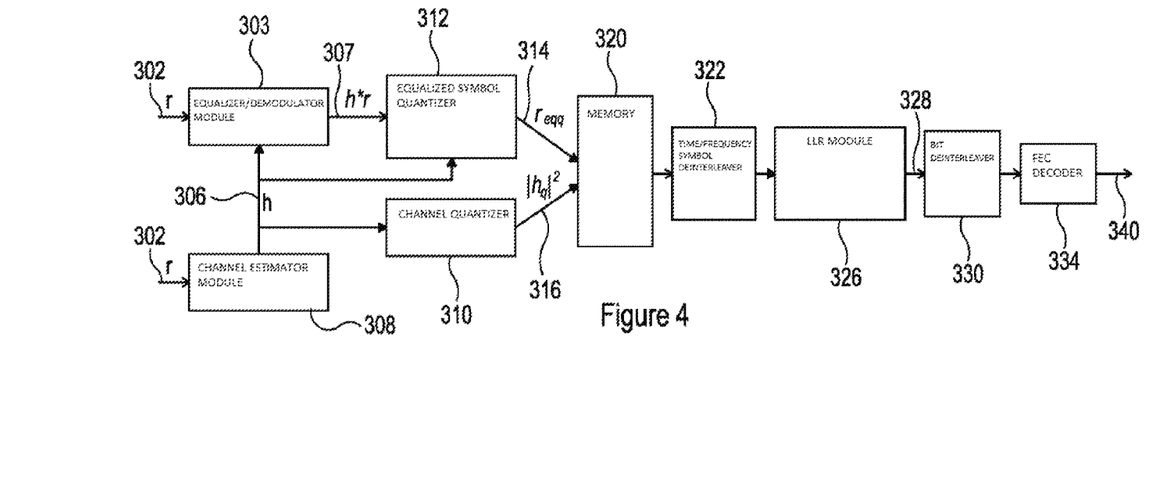
FIG. 4 is an arrangement for processing a received signal by a receiver according to an alternative example of the present disclosure.

FIG. 4 shows another embodiment. In FIG. 4, a similar approach may be applied to an equalized received signal. The equalized received signal 307 is generated by supplying the signal 302 to an equalizer/demodulator module 303. The estimated channel state information value 306 is also provided to the equalizer/demodulator module 303. An equalized signal may then be generated by combining the raw symbols of the signal 302 with the complex conjugate of the channel state information value 306 to derive the equalized received signal 307. An equalized symbol quantizer 312, and a channel quantizer 310 then quantize the equalized symbols and the channel state information value 306 as described above with respect to FIG. 3. A sequence of equalized quantized symbols 314 is generated, along with a sequence of the modulus of the quantized channel information state values 316. As described with regard to FIG. 3, memory 320, time/frequency symbol deinterleaver 322, bit deinterleaver 330 and FEC decoder 334 are provided. In this example, the LLRs 328 for each bit are computed in module 326 using the sequence of equalized quantized symbols 314 and the sequence of modulus quantized channel state information values 316 before bit deinterleaving 330 and generation of decoded bits 340.

Figure 5:
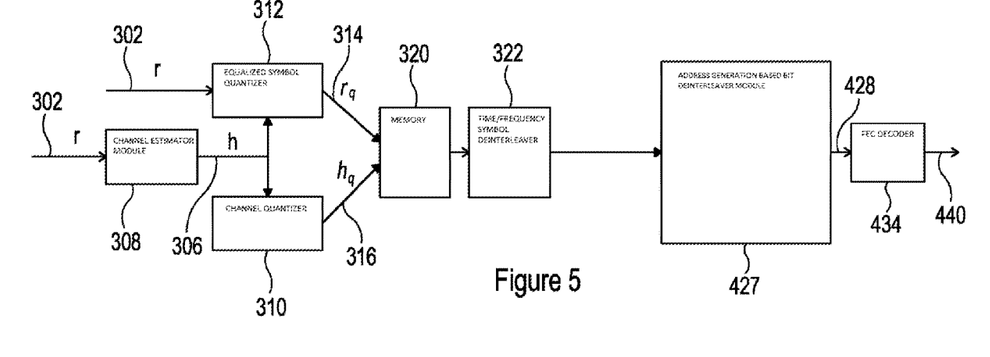
FIG. 5 is a further alternative arrangement for processing a received signal by a receiver according to another example of the present disclosure.
Figure 6:
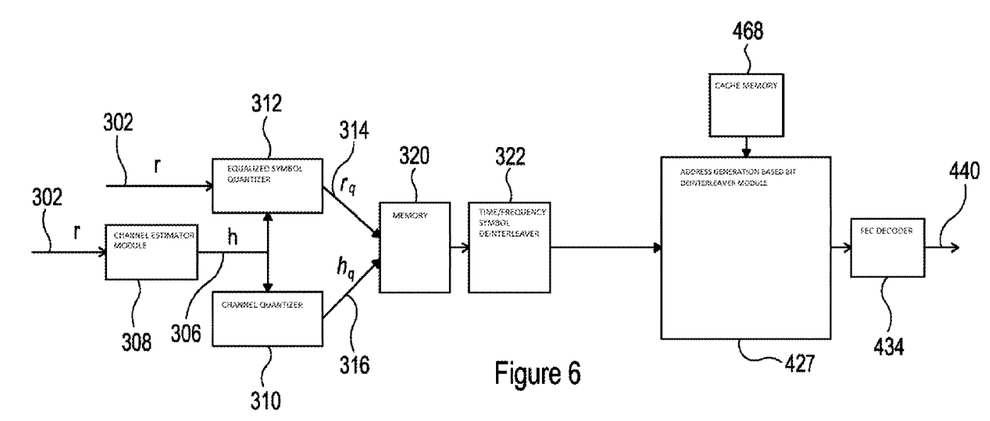
FIG. 6 is a modification of the arrangement shown in FIG. 5.

An alternative configuration for processing the signal chooses to reduce the bit deinterleaver size by combining the demodulation of a compressed equalized signal and the bit deinterleaving step as shown in FIG. 5. Accordingly, blocks 326 and 330 of FIG. 4, or blocks 226 and 230 or FIG. 3 are combined within a single address generation based bit deinterleaver module 427. By using this approach, individual LLRs 428 are not stored to a memory, but the compressed equalized symbols and channel state information values are. When the address generation based bit deinterleaver 427 requests LLR information with a specific bit indicator, the related equalized raw symbol and channel state information values are read from the memory 322 and the LLR 428 is generated on the fly to be sent to FEC decoder 434. Since for an M-QAM symbol the same information will be called for $\log_2(M)$ times, a cache memory 468 may also be used to access the information faster as shown in FIG. 6. For both FIG. 5 and FIG. 6, a received signal 302 is provided to an equalized symbol quantizer 312 and a channel estimator module 308. The determined channel state information value 306 is then provided to both a channel quantizer 310 and equalized symbol quantizer 312. Quantized symbols 314 and quantized channel state information values 316 are then generated and provided to memory module 320. As described with regard to FIG. 3, a time/frequency symbol deinterleaver 322 and FEC decoder 434 are also provided.

Figure 7:
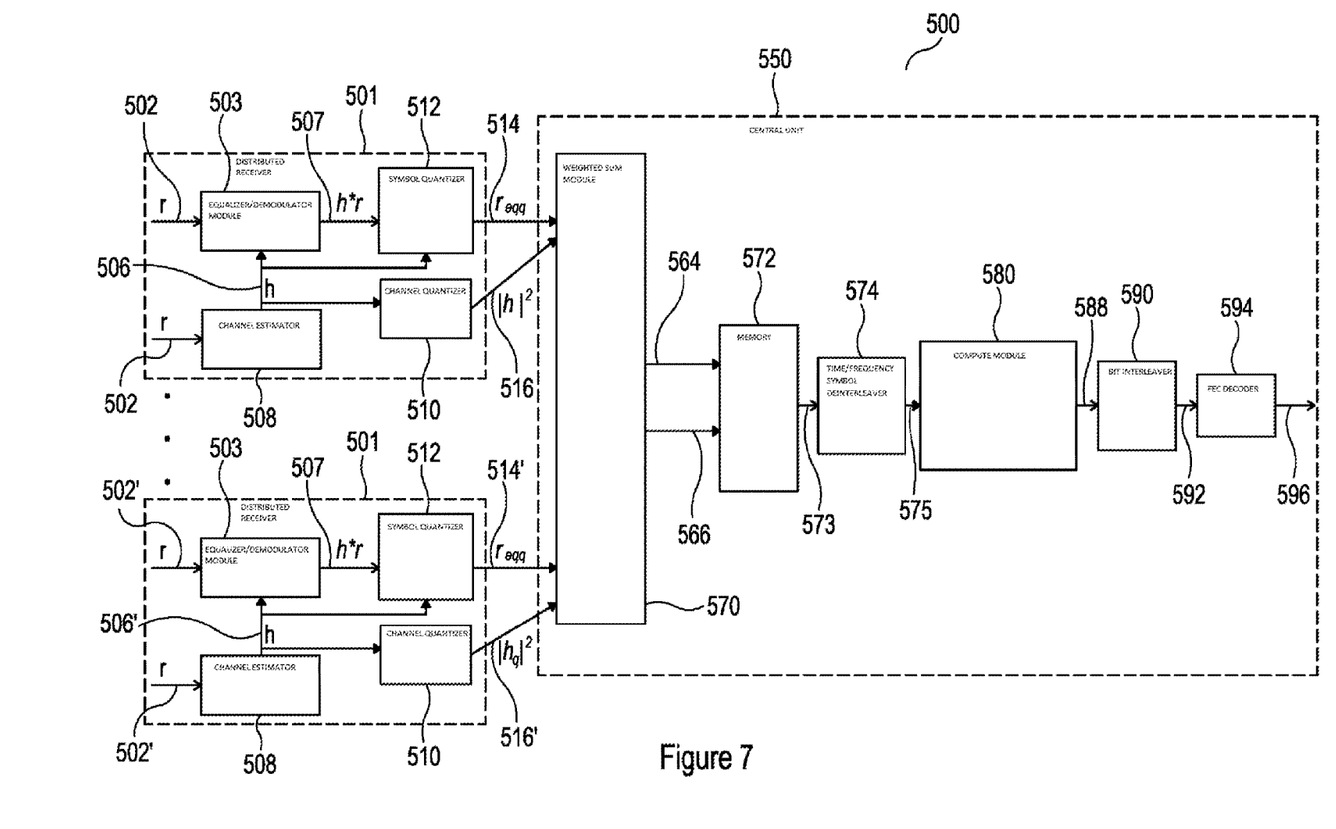
FIG. 7 is schematic outlining the processing of a received signal by an arrangement according to an example of the present disclosure.

FIG. 7 briefly presents a distributed receiver architecture 500 where multiple distributed receivers 501 have multiple observations of the same data through different channels. Each distributed receiver compresses a received signal 502, 502', r, and channel information 506, 506' and sends the compressed information, shown as quantized equalized symbols 514, 514' and modulus quantized channel information 516, 516' to central unit 550 via a wired or wireless connection. A common received signal is a signal received by all receivers 501 in the distributed receiver architecture 500, however each receiver is likely to have experienced a different quality channel (i.e. a good channel or a deep faded channel etc.). The central unit 550 combines the compressed data into a single combined channel 566 and a single received signal 564 using a weighted sum module 570 and undertakes the rest of the processing on the combined channel 566 and combined signal 564. The combined signal 564 may be determined from a weighted sum of the received equalized symbols. The combined channel may be determined by taking the square root of the sum of the squared magnitudes of the individual channel state values 516.

In particular, the combined channel 566 and combined signal 564 are stored in memory 572 before being supplied to a time/frequency symbol deinterleaver 574. The stream of deinterleaved symbols 575 are provided to a compute module 580 where LLRs 588 are computed from the combined channel 566 and combined signal 564. A second bit interleaver 590 deinterleaves the bits based on the LLRs 588 and supplies this information 592 to a FEC decoder 594. A stream of decoded bits 596 can then be determined and output. This distributed approach significantly reduces the bandwidth needed to send the information about the received signal 502 or the subsequently generated LLRs 588 from the distributed receivers 501 to the central unit 550.

Accordingly, in the proposed approach, one challenge is finding an efficient way of quantizing the received signal or equalized received signal. In an example, the received signal is a noisy observation of the scaled version of 64QAM modulated symbol, e.g., s, with the channel, e.g., h, and additive noise factor, e.g., n.

$$r=hs+n$$

Figure 8A:
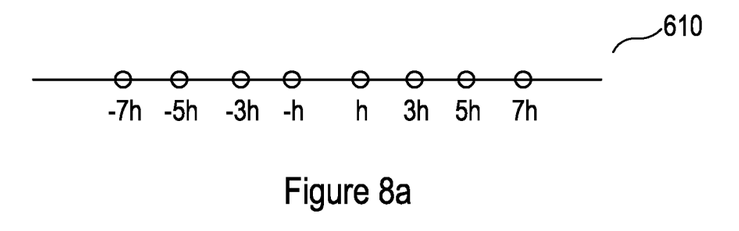
FIG. 8a is a representation of the in-phase or quadrature components of a received 64QAM modulated symbol.
Figure 8B:
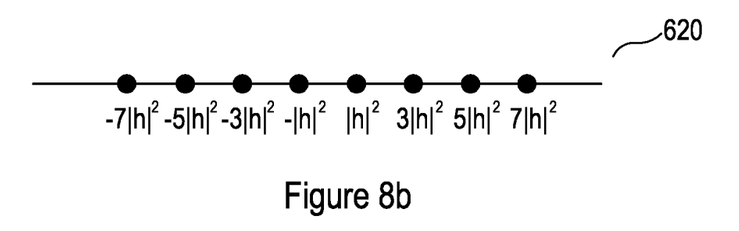
FIG. 8b is a representation of the in-phase or quadrature components of an equalized received 64QAM modulated symbol.

This is shown in FIGS. 8a and 8b. Assuming non-normalized power, s, the raw symbol will have one of the values $\{-7, -5, -3, -1, 1, 3, 5, 7\}$ in the in-phase (I) and quadrature (Q) part of the signal. Neglecting noise, n, the received signal will have one of the values $\{-7\,h, -5\,h, -3\,h, -h, h, 3\,h, 5\,h, 7\,h\}$ as an I and Q part, 610. If the signal is equalized, the received signal will have one of the values $\{-7|h|^2, -5|h|^2, -3|h|^2, -|h|^2, |h|^2, 3|h|^2, 5|h|^2, 7|h|^2\}$, 620. The channel then takes different values depending on the communication link. If there is a very strong line-of-sight (LOS) between transmitter and receiver, the channel behaves with almost a phase distortion only. However, if there is no LOS, the channel will behave like a Rayleigh fading channel, and will have both phase and magnitude distortion. The magnitude generally has quite a large dynamic range, e.g., 30-40 dB. Thus, to be able to quantize the received signal directly, it is able to quantize a very large dynamic range, and use a large number of bits to represent the received signal, r, or equalized received signal, $r_{eq}$ as described above.

When the noise is also considered, the dynamic range of the received signal becomes even larger. By exploiting the channel state information, h or $|h|^2$ an efficient quantization/compression method for received or equalized received signals can be used. An appropriate range for the compression and quantization step must be determined. A scaled version of channel/channel magnitude squared to define the dynamic range to be compressed can be used. For example, for 64QAM, limiting the dynamic range of received signal allows the use of from −7 h to 7 h, and h/2 as the quantization step. For example, by representing the received signal as multiples of h/2 with 29 levels, e.g., $r_q$=m1*h/2, where m1 is the level information from [−14, −13, . . . 13, 14], depending on the total number of bits to be used, the quantization step, $\Delta_r$=α. h, and dynamic range can be modified. In this case, α is a scalar factor, such as ½ and h is the channel. Accordingly, the scalar factor α chooses the number of levels such that as the bits increases, α decreases.

Alternatively, for quantizing the equalized received signal, one chooses the dynamic range from −7$|h|^2$ to 7$|h|^2$, with $|h|^2$/2 as the quantization step with 29 levels, e.g., $r_{eqq}$=m1*$|h|^2$/2, with again m as the level information from [−14, −13, . . . 13, 14]. The channel state information values are typically quantized depending on the code rate and average channel magnitude and phase and operating SNR. By opting to do phase compensation first on the received signal it is only necessary to quantize a real channel value, |h|. For the equalized received signal case, $|h|^2$, is quantized and can be quantized by uniformly or nonuniformly quantizing |h|, e.g., $|h_q|$=m2*$\Delta_h$ where m2 is the level information and $\Delta_h$ is the quantization step chosen for quantizing the channel magnitude. The $\Delta_h$ value can be adapted according to the expected/estimated channel dynamics, operating SNR etc.

After quantizing the received signal and channel, this information is generally stored, e.g., m1, m2 and a common $\Delta_r$ and $\Delta_h$, and interleaving operations performed on the information. Just before bit interleaving, the LLRs are generated by using a conventional demodulator with the inputs, $r_{em}$ and $|h_q|^2$. $r_{eqq}$ is computed as $r_{eqq}$=m1*α(m2*$\Delta_h$)$^2$. LLRs can then be computed using decompressed/approximated $r_{eqq}$ and $|h_q|^2$=(m2*$\Delta$)$^2$.

So for a 64QAM modulated symbol, it is only required to store m1 and m2 information for each symbol. Assuming 29 levels are used for quantizing I and Q parts of an equalized received signal, and 8 levels for channel information, it is necessary to store approximately (2×5+3)=13 bits in total instead of 6×5=30 bits leading to more than 50% saving in memory storage requirements for data, such as LLRs.

Figure 9:
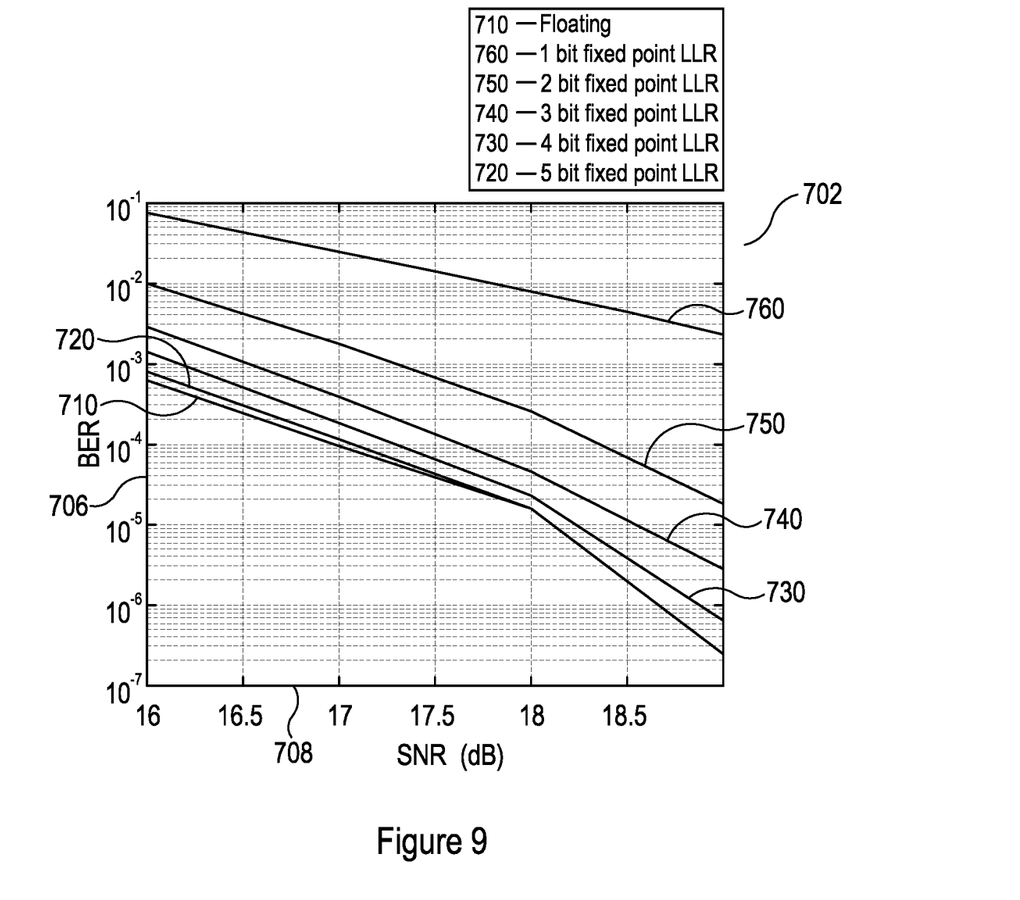
FIG. 9 is the reception performance of a conventional coded AWGN channel with 64 QAM modulation.
Figure 10:
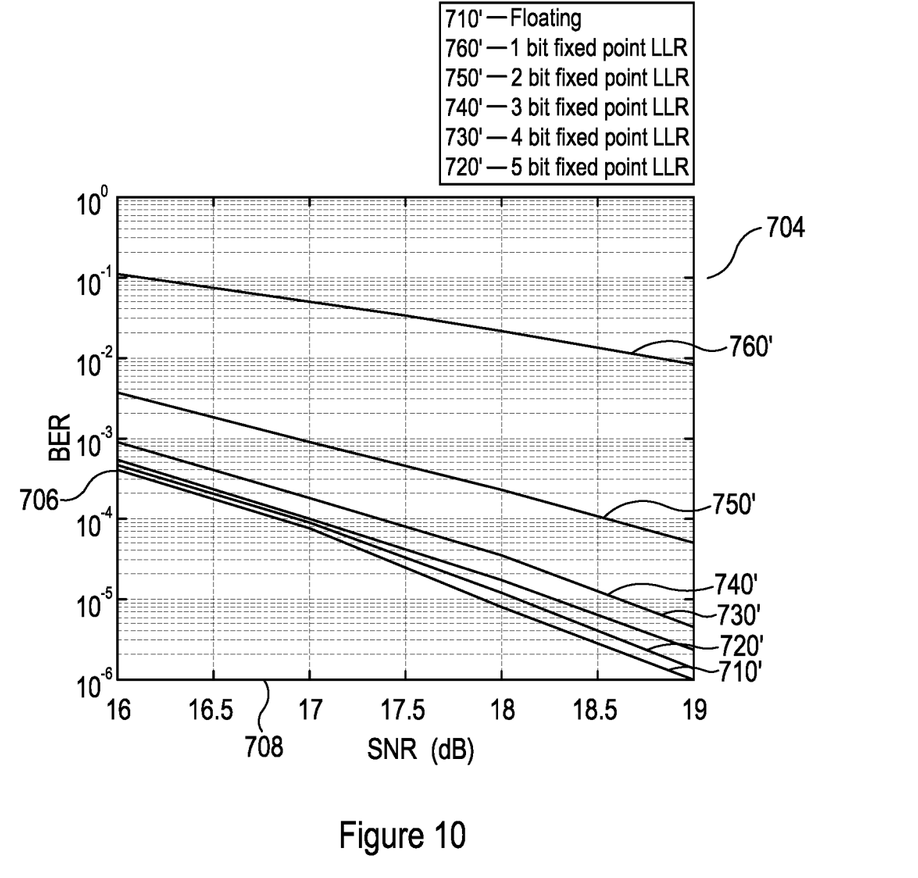
FIG. 10 is the reception performance of a conventional coded Rayleigh fading channel with 64 QAM modulation.

When a conventional uniform quantization method is used, the reception performance gets worse as the number of bits per LLR is decreased. This is shown in FIGS. 9 and 10 for an AWGN channel 702 and Rayleigh fading 704 channel respectively, both convolutional coded with a bit rate of ½ and polynomials of [133 171] and shows the bit error rate 706 against the average signal to noise ratio 708. When a conventional way of uniform quantization is applied, i.e. by varying the bit length of the LLRs, the loss in performance is significant with respect to floating point performance. It can be seen that performance derogates from floating point performance 710, 710'.

Figure 11:
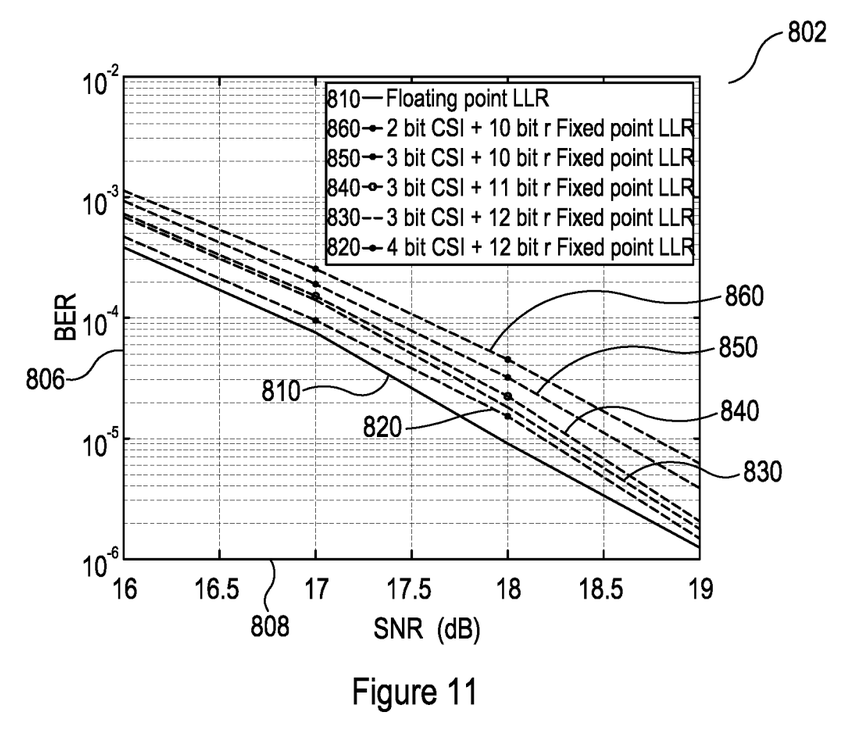
FIG. 11 is the reception performance for quantized symbols with a different number of bit allocated to channel state information according to the present disclosure in a Rayleigh fading channel.

In FIG. 11, the performance of the proposed quantisation method for a 64 QAM modulated and convolutionally coded system with code rate ½ and polynomials as [133 171] in a Rayleigh fading channel is shown with the bit error rate 806 against the average signal to noise ratio 808. It can be observed that even with compression of the information to 2 bits of channel state information (CSI) and 10 bit quantization of the received signal (so a total of 12 bits) 860, the performance does not get more than 0.7 dB worse than with respect to floating point LLR performance 810 at BER of 10$^{-4}$. This gives the use of net 2 bit/LLR. Note that the performance of using 2 bit/LLR in a conventional way, leads to around 1.6 dB loss with respect to floating performance 710. Thus, the proposed method improves performance by around 0.9 dB with respect to the conventional approach when a total of 12 bits are used to represent the LLR values. Increasing the total number of bits used to 15, we approach the floating point LLR performance 810, e.g., less than 0.1 dB loss, which is only achievable by a 5 bit/LLR 720 in a conventional approach. Thus, to achieve a performance very close to an ideal case, it is necessary to spend only 15 bits with the present methods, instead of 5×6=30 bits in conventional methods. This leads to a saving of 50% in memory size if the LLRs need to be stored in memory or a decrease of 50% in data throughput if the LLRs need to be sent to another node to be processed further. Lowering the total number of bits used as shown in 840, 850 and 860 also provides less of an impact on performance than typical LLR bit length reductions.

The overhead of representing the channel state information can be reduced if some of the raw symbols experience very correlated channels as in a slowly varying channel or a flat fading channel or for successive subcarriers in time and frequency in an OFDM system. Choosing to represent the channel state for a block of received signals that experience similar channel distortions can assist this.

Another extension could be analyzing the dynamic range of channel that the receiver experiences, and allocating more bits for channel information if the dynamic range of the channel is larger, and less bits if the dynamic range of the channel is limited as in additive white Gaussian Noise (AWGN) channels or channels with strong LOS components or flat fading channels.

The proposed methods are beneficial in different scenarios. One scenario is wireless communication systems using large constellation sizes, e.g., 16 QAM, 64 QAM etc., with large interleaver memory such as digital radio, TV standards and satellite communication systems. The proposed approach may reduce memory requirements of such receivers.

A second scenario would be for systems where the LLRs from large constellation sizes need to be sent to a master processing unit to be processed further. An example of such a system is distributed receiver architectures where the distributed receivers compress the received signal and channel state information values and sends these to a master processing unit to be processed further. A more specific example is a distributed Intelligent Transport System (ITS) receiver in a car where distributed receiver chips send their own observations of transmitted signal to each other to further combine the multiple observations to get more reliable reception of the signals. Another system where such kind of approaches may be applicable is low power radios with physical size constraints such as in Internet of Things devices or medical devices such as hearing aids. FEC with interleaving helps to improve the reception quality. However, interleaving adds a memory cost to these devices. The current disclosure describes methods to reduce the memory cost of such devices.

Another application is the communication devices using HARQ mechanisms. HARQ is a mechanism where different redundancies of the same data are sent through a communication channel to a receiver until the receiver can decode the data successfully. To get best performance, the receiver should utilize all or most of the received signals. If it cannot decode the signal successfully, it stores this information until the new information, e.g., more redundancy bits or repetition of the bits, is received and then, combines the existing information with the new information to try to decode it again. Thus, the receiver needs quite a large amount of data memory to store the existing information until the next round of information is received. The present disclosure can be used to reduce the memory size required to store the existing information, e.g., redundancy bits.

The above described approach can also be used as a relaying mechanism to send a message from a cooperating/ relay node to the intended receiver such as Internet of Things devices or sensor nodes or even mobile phones etc.

From reading the present disclosure, other variations and modifications will be apparent to the skilled person. Such variations and modifications may involve equivalent and other features which are already known in the art of, and which may be used instead of, or in addition to, features already described herein. For example, although wireless signals are typically referred to, the skilled person would appreciate the application of the present disclosure to non-wireless signals, particularly those that utilise interleaving.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of processing a signal, said method comprising the steps of:
    receiving a signal comprising a plurality of raw symbols, each raw symbol having a plurality of bits and being conveyed in a channel;
    estimating a channel state information value of the channel used to convey each raw symbol to generate a corresponding plurality of channel state information values;
    quantizing the plurality of raw symbols based on their channel state information values to generate a sequence of quantized symbols, wherein quantizing the plurality of raw symbols comprises quantizing the raw symbols into a number of quantization bins and defining a width of each of the quantization bins according to a fractional factor of the channel state information values, wherein the step of quantizing the plurality of raw symbols further comprises the step of: equalising the raw symbols using the complex conjugates of their channel information values prior to quantization of the symbols; and
    quantizing the channel state information values to generate a sequence of quantized channel state values.

2. The method of claim 1, further comprising the step of:
    calculating a sequence of soft bit values, based on the sequence of quantized symbols and the sequence of quantized channel state values.

3. The method of claim 1, wherein each quantization bin has a quantization value and wherein a dynamic range of quantization values of the bins is a scaled version of a magnitude of the corresponding channel, dependent upon a modulation chosen for the signal.

4. The method of claim 1, wherein the step of quantizing the plurality of channel state information values comprises the step of:
    quantizing the channel state information values into a number of channel quantization bins, each channel quantization bin having a width representative of one or more channel state information values.

5. The method of claim 1, further comprising the steps of:
    storing the sequence of quantized symbols and/or the sequence of quantized channel state values; and/or
    transmitting the sequence of quantized symbols and/or the sequence of quantized channel state values to a module for further processing.

6. The method of claim 1, wherein the channel information values are quantized dependent upon one or more of a code rate, average magnitude of the channel, the phase of the channel or the operating signal to noise ratio.

7. The method of claim 1, wherein the soft bit values are LLR values calculated for each bit.

8. An integrated circuit for a receiver configured to process a signal, the integrated circuit configured to:
    process the signal according to the method of claim 1.

9. The method of claim 3, wherein the modulation chosen for the signal is a quadrature amplitude modulation scheme, known as QAM, or a multiple frequency phase shift keying scheme, known as MPSK.

10. The method according to claim 7, wherein the method further comprises:
    providing the LLRs of each bit to a bit deinterleaver and undertaking bit deinterleaving;
    providing the output from the bit deinterleaver to a forward error correction block and undertaking forward error correction of the signal; and
    outputting a stream of decoded bits from the forward error correction block.

11. The method of claim 10, wherein the step of providing the LLRs of each bit further comprises the step of accessing the quantized symbol and channel information for LLR calculation from a cache memory.

12. A communication system comprising one or more receivers, each receiver being configured to receive a signal comprising a plurality of a raw symbols, each raw symbol having a plurality of bits and being conveyed in a channel, said receiver comprising:

a channel estimator module for estimating channel state information values of the channel used to convey a signal;

a symbol quantization module for quantizing the plurality of raw symbols based on their channel state information values to generate a sequence of quantized symbols, wherein the symbol quantization module is further configured to quantize the raw symbols into a number of quantization bins and to define a width of each of the quantization bins according to a fractional factor of the channel state information values, wherein the symbol quantization module is further configured to equalize the raw symbols using the complex conjugates of their channel information values prior to quantization of the symbols; and a channel quantization module for quantizing the channel state information values to generate a sequence of quantized channel states.

13. The communication system of claim 12, further comprising a central unit configured to receive, from each of the one or more receivers, one or more of the quantized symbols and one or more of the quantized channel states, wherein the central unit comprises:

a processor for generating a combined quantized symbol of the received one or more of the quantized symbols and for generating a combined quantized channel state value, from the one or more receivers;

a soft bit module for generating a soft bit value based on the combined quantized symbol and the combined quantized channel state values; and a deinterleaver module for deinterleaving the combined quantized symbol and the combined quantized channel state.

* * * * *